United States Patent
Yoshida

(10) Patent No.: US 12,515,906 B2
(45) Date of Patent: Jan. 6, 2026

(54) IMAGE FORMING APPARATUS AND DISPLAY CONTROL METHOD

(71) Applicant: SHARP KABUSHIKI KAISHA, Sakai (JP)

(72) Inventor: Mayuko Yoshida, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 64 days.

(21) Appl. No.: 18/509,786

(22) Filed: Nov. 15, 2023

(65) Prior Publication Data

US 2024/0199360 A1 Jun. 20, 2024

(30) Foreign Application Priority Data

Dec. 16, 2022 (JP) ................. 2022-201463

(51) Int. Cl.
| | |
|---|---|
| B65H 3/44 | (2006.01) |
| B41J 11/48 | (2006.01) |
| B65H 11/00 | (2006.01) |
| G06F 3/12 | (2006.01) |

(52) U.S. Cl.
CPC .......... *B65H 11/002* (2013.01); *B41J 11/485* (2013.01); *B65H 3/44* (2013.01); *G06F 3/1205* (2013.01); *B65H 2511/415* (2013.01); *B65H 2551/18* (2013.01); *B65H 2551/21* (2013.01); *B65H 2551/26* (2013.01); *B65H 2801/06* (2013.01)

(58) Field of Classification Search
CPC .. B65H 3/44; B65H 2551/18; B65H 2551/20; B65H 2551/21; B65H 2551/26; G03G 15/6508; G03G 15/5016; G03G 15/502; G03G 15/553; G03G 15/6502; B41J 11/485; G06F 3/1205; G06F 3/1204; G06F 3/1203; G06F 3/1263; G06F 3/1258; G06F 3/1275

See application file for complete search history.

(56) References Cited

U.S. PATENT DOCUMENTS

| | | | | |
|---|---|---|---|---|
| 2003/0230842 | A1* | 12/2003 | Shiho | H04N 1/2307 271/9.01 |
| 2008/0003000 | A1* | 1/2008 | Taki | G03G 21/203 399/44 |
| 2010/0034550 | A1 | 2/2010 | Arai et al. | |
| 2011/0083095 | A1* | 4/2011 | Konuma | H04N 1/00477 358/1.15 |
| 2014/0063517 | A1* | 3/2014 | Tachibana | G03G 15/502 358/1.12 |
| 2018/0152572 | A1* | 5/2018 | Yano | H04N 1/00506 |

FOREIGN PATENT DOCUMENTS

| | | |
|---|---|---|
| JP | 2005-121910 A | 5/2005 |
| JP | 2010-044142 A | 2/2010 |

\* cited by examiner

*Primary Examiner* — Luis A Gonzalez
(74) *Attorney, Agent, or Firm* — ScienBiziP, P.C.

(57) ABSTRACT

An image forming apparatus includes: an image former, a paper feed tray that feeds a sheet to the image former; a display that displays a list of tray information on the paper feed tray, based on a mounting order with respect to an apparatus; and a controller that controls display of the display. The controller changes a display order of a list of the tray information according to a display priority based on an image forming operation.

7 Claims, 17 Drawing Sheets

| PAPER FEED TRAY MANAGEMENT TABLE | | | | |
|---|---|---|---|---|
| TRAY ID | MOUNTING POSITION | DISPLAY POSITION | REMAINING AMOUNT | SHEET INFORMATION |
| 1 | #1 | D1 | ≡ | A4<br>PLAIN PAPER 1 |
| 2 | #2 | D2 | ≡ | A4<br>Transparency Letter 85 gsm type 3 |
| 3 | #3 | D3 | ⊔ | A4<br>Legal 105 gsm Hammermill Color Copy |
| 4 | #4 | D4 | ≡ | A4<br>11x17 219 gsm C2S Mohwkawk Cover Gloss |
| 5 | #5 | D5 | ≣ | A4<br>Plain NCR Letter 82 gsm |
| 6 | #6 | D6 | ≣ | A4<br>11x17 219 gsm C2S Mohwkawk Cover Gloss |
| 7 | #7 | D7 | ≣ | A4<br>11x17 219 gsm C2S Mohwkawk Cover Gloss |
| 8 | #8 | D8 | ⊔ | A4<br>Legal 105 gsm Hammermill Color Copy |

| JOB MANAGEMENT TABLE | | | | | | |
|---|---|---|---|---|---|---|
| JOB ID | SET TIME | USER/MODE | SET NUMBER OF COPIES | STATUS | IMAGE DATA | TRAY ID |
| 0101 | 2020/04/01 15:30 | COPY | 0050 | WAITING | /MFP/ADF/001234571.pdf | 01 |
| 0100 | 2020/04/01 14:50 | COPY | 0050 | WAITING | /MFP/ADF/001234570.pdf | 05 |
| 0099 | 2020/04/01 13:35 | COPY | 0050 | WAITING | /MFP/Data/002456789.jpg | 03 |
| 0098 | 2020/04/01 10:15 | COPY | 0050 | WAITING | /MFP/ADF/001234569.pdf | 05 |
| 0097 | 2020/04/01 09:30 | COPY | 0050 | COPYING | /MFP/ADF/001234568.pdf | 07 |
| ⋮ | ⋮ | ⋮ | ⋮ | ⋮ | ⋮ | ⋮ |

IMAGE FORMING APPARATUS AND DISPLAY CONTROL METHOD

BACKGROUND OF THE INVENTION

Field of the Invention

The present disclosure relates to an image forming apparatus, and the like.

Description of the Background Art

Some image forming apparatuses such as a multifunction peripheral and a copying machine are capable of mounting a plurality of paper feed trays that store sheets or the like as recording media. For example, there is an apparatus in which a paper feed tray capable of storing a large amount of sheets, a paper feed tray associated with storage of long-sized sheets, or the like is added as an optional device, and it is possible to reduce time and effort for sheet replenishment and a frequency of printing interruption.

Some of these image forming apparatuses are capable of displaying, on a display device (operation display screen) or the like included therein, information related to a mounted state of a mounted paper feed tray, and sheet information (for example, a sheet name, a sheet size, a basis weight, the remaining number of sheets that can be fed, and the like) on sheets to be stored in a paper feed tray, as paper feed tray information (for example, conventional art documents).

An object of the present disclosure is to provide an image forming apparatus and the like capable of improving user convenience by efficiently displaying, on a display device, tray information on a paper feed tray without requiring a special operation by a user.

SUMMARY OF THE INVENTION

In order to solve the above problem, an image forming apparatus according to the present disclosure includes an image former; a paper feed tray that feeds a sheet to the image former; a display that displays a list of tray information on the paper feed tray, based on a mounting order with respect to an apparatus; and a controller that controls display of the display. The controller changes a display order of a list of the tray information according to a display priority based on an image forming operation.

Further, an image forming apparatus according to the present disclosure includes an image former; a paper feed tray that feeds a sheet to the image former; a display that displays a list of tray information on the paper feed tray, based on a mounting order with respect to an apparatus; and a controller that controls display of the display. The controller determines the tray information to be displayed, and displays the tray information, in a case where the tray information determined to be displayed is not included in list display during display.

Further, a display control method according to the present disclosure is a display control method of controlling display of tray information on a paper feed tray that feeds a sheet to an image former. The display control method includes displaying a list of the tray information, based on a mounting order with respect to an apparatus; and changing a display order of a list of the tray information according to a display priority based on an image forming operation.

Further, a display control method according to the present disclosure is a display control method of controlling display of tray information on a paper feed tray that feeds a sheet to an image former. The display control method includes displaying a list of the tray information, based on a mounting order with respect to an apparatus, determining the tray information to be displayed, and displaying the tray information, in a case where the tray information determined to be displayed is not included in list display during display.

According to the present disclosure, it is possible to provide an image forming apparatus and the like capable of improving user convenience by efficiently displaying, on a display device, tray information on a paper feed tray without requiring a special operation by a user.

BRIEF DESCRIPTION OF THE DRAWINGS

FIG. 2A is a diagram illustrating a paper feed tray management table.

FIG. 2B is a diagram illustrating a job management table.

DESCRIPTION OF THE PREFERRED EMBODIMENTS

Hereinafter, embodiments according to the present disclosure are described with reference to the drawings. Note that, the following embodiments are an example for describing the present disclosure, and the technical scope of the description described in the claims is not limited to the following description.

Since a display device included in an image forming apparatus is restricted in terms of a displayable area, a screen configuration, and the like, there is a limit to the number of pieces of tray information (the amount of information) on paper feed trays that can be displayed at once. In particular, in an image forming apparatus of a light production model, since the number of paper feed trays to be mounted in the apparatus increases, the number of pieces of tray information to be displayed on a display device inevitably increases. Consequently, tray information on a paper feed tray desired to be displayed by a user may not be displayed on a display screen.

In order to achieve display of tray information on a paper feed tray desired by the user, for example, a conventional art describes a sheet processing system capable of visually recognizing a sheet processing apparatus in an operating state. Further, another conventional art describes an image forming apparatus in which a paper feed tray to be used in a job, and a level of an estimated remaining amount of sheets (remaining amount is present/small/absent) are displayed to be visually recognizable on a job scheduling screen.

However, in the conventional arts, in a case where tray information on a paper feed tray desired by the user is not displayed due to the restriction of a displayable area in a display device, the user needs to perform some operation such as a page feeding operation, which is not superior in convenience.

In the present disclosure, an image forming apparatus capable of improving user convenience by efficiently displaying, on a display device, tray information on a paper feed tray without requiring a special operation by a user is achieved by the following embodiments.

First Embodiment

A first embodiment is an embodiment of an image forming apparatus including: an image former, a paper feed tray that feeds a sheet as a recording medium to the image former, a display that displays a list of tray information on the paper feed tray, based on a mounting order with respect to an apparatus, and a controller that controls display of the display. The controller changes a display order of a list of the tray information according to a display priority based on an image forming operation. In the first embodiment, a multifunction peripheral capable of achieving, in one housing, a job related to each operation mode such as printing, copying, faxing, and image transmission is described as an embodiment of an image forming apparatus.

1.1 Functional Configuration

Figure 1:
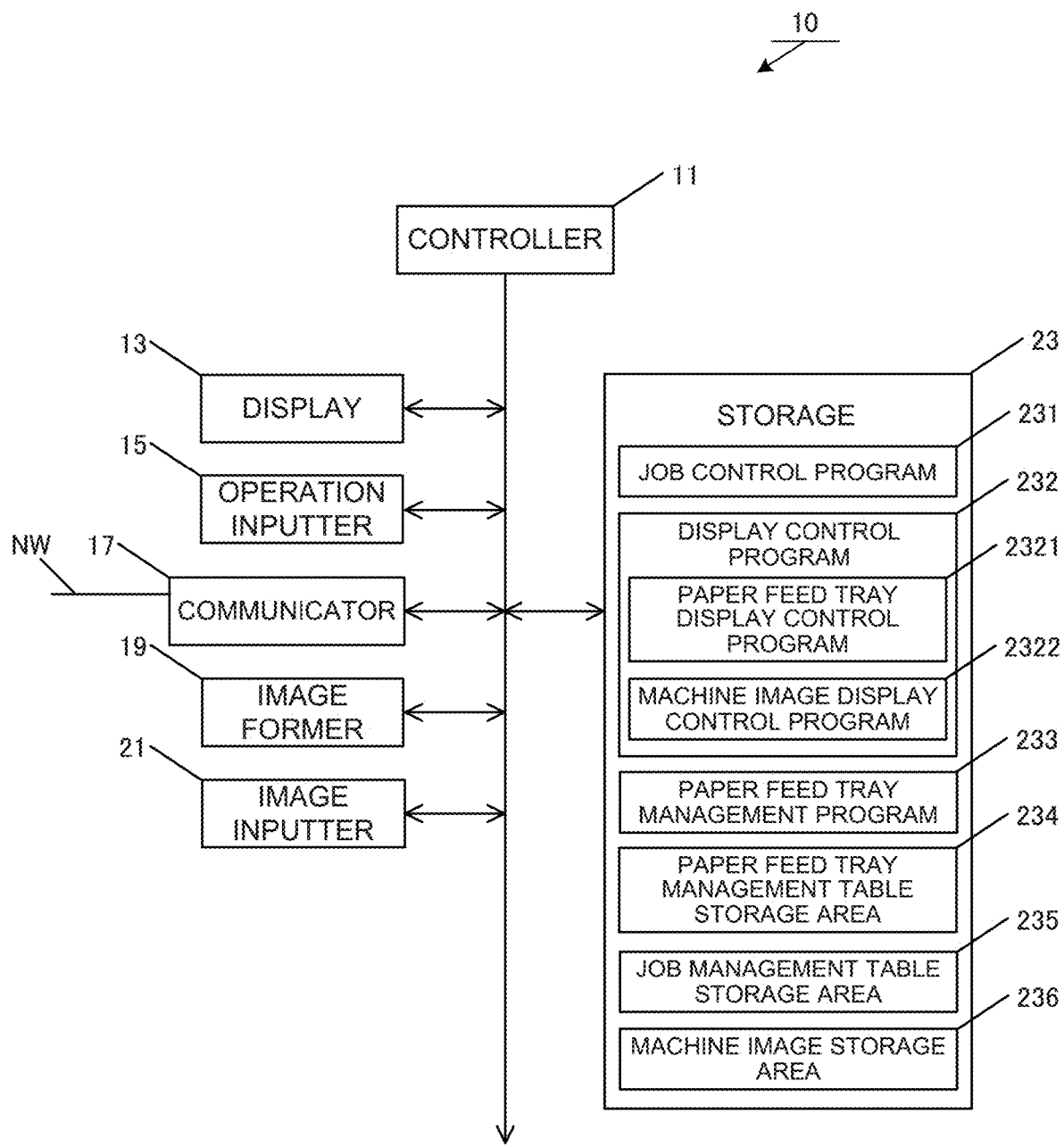
FIG. 1 is a diagram illustrating a functional configuration of a multifunction peripheral according to a first embodiment.

A functional configuration of a multifunction peripheral 10 according to the first embodiment is described. FIG. 1 is a functional block diagram of the multifunction peripheral 10. The multifunction peripheral 10 includes a controller 11, a display 13, an operation inputter 15, a communicator 17, an image former 19, an image inputter 21, and a storage 23.

The controller 11 controls the entirety of the multifunction peripheral 10. The controller 11 is configured of, for example, one or a plurality of arithmetic devices (central processing units (CPUs) or the like). The controller 11 achieves its functions by reading and executing various programs stored in the storage 23.

The display 13 is a display device that displays various pieces of information to a user or others. The display 13 can be configured of, for example, a liquid crystal display (LCD), an organic electro-luminescence (EL) display, or the like.

The operation inputter 15 receives an input of information by a user or others. The operation inputter 15 can be configured of hard keys (e.g., a numeric keypad), buttons, and the like. Note that, the operation inputter 15 can be configured as a touch panel that allows an input via the display 13. In this case, as an input method of a touch panel, for example, a general method such as a resistive film method, an infrared method, an electromagnetic induction method, and an electrostatic capacitance method can be employed.

The communicator 17 includes either one or both of wired and wireless interfaces for performing communication with another device via a network (NW) such as, for example, a local area network (LAN), a wide area network (WAN), the Internet, a telephone line, or a fax line.

The image former 19 forms an image based on image data on a sheet or the like as a recording medium. The image former 19 feeds a sheet from a paper feed tray, forms an image based on image data on the sheet, and then discharges the sheet to a paper discharger. The image former 19 can be configured of, for example, a laser printer or the like utilizing an electrophotographic method. In this case, the image former 19 performs image formation by using toner supplied from unillustrated toner cartridges associated with toner colors (e.g., cyan, magenta, yellow, and black).

Note that, a paper feed tray according to the present disclosure can be configured as a box-shaped member in which sheets can be stacked and stored. The paper feed tray can be configured to have a shape and a size according to the size of a sheet to be stored, the number of storable sheets, and the like, and a plurality of paper feed trays can be mounted to the multifunction peripheral 10. The paper feed tray includes an unillustrated paper feed mechanism for the image former 19, and, for example, an optical or mechanical sheet detection sensor for detecting the remaining amount of sheets (remaining number of sheets).

The image inputter 21 generates image data by scanning a document. The image inputter 21 includes, for example, an image sensor such as a charge coupled device (CCD) or a contact image sensor (CIS), and can be configured as a scanner device having an automatic document feeding device (ADF: automatic document feeder), a flatbed for placing and reading a document, or the like. A configuration of the image inputter 21 is not particularly limited, as far as the image inputter 21 has a configuration capable of generating image data by reading a reflected light image from a document image by an image sensor. Note that, the image inputter 21 may be configured as an interface capable of acquiring image data stored in a portable storage medium such as a universal serial bus (USB) memory, or image data transmitted from an external terminal device (information processing device).

The storage 23 stores various programs necessary for an operation of the multifunction peripheral 10, and various pieces of data. The storage 23 can be configured of a storage device such as, for example, a random access memory (RAM), a hard disk drive (HDD), a solid state drive (SSD), and a read only memory (ROM).

In the first embodiment, the storage 23 stores a job control program 231, a display control program 232, and a paper feed tray management program 233, and secures a paper feed tray management table storage area 234, a job management table storage area 235, and a machine image storage area 236.

The job control program 231 is a program to be read by the controller 11 in order to perform processing related to each operation mode such as printing, copying, faxing, and image transmission in the unit of job. The controller 11 that has read the job control program 231 performs control of executing, holding, and stopping a job by controlling the display 13, the operation inputter 15, the communicator 17, the image former 19, the image inputter 21, and the like. In addition, the controller 11 that has read the job control program 231 manages a job by performing job registration, deletion, updating, and the like with respect to a job management table to be described later.

The display control program 232 is a program to be read by the controller 11 when a display screen to be displayed by the display 13 is controlled. The controller 11 that has read the display control program 232 generates screen information related to a home screen that receives selection and the like of an operation mode related to execution of a job, an unillustrated job setting screen for receiving an input of various setting values related to execution of a job, a system information screen as an information screen to be described later, and the like, and displays the screen information on the display 13.

The display control program 232 includes a paper feed tray display control program 2321, and a machine image display control program 2322. The controller that has read the paper feed tray display control program 2321 controls display of tray information. Further, the controller 11 that has read the machine image display control program 2322 performs control of generating a machine image in which an apparatus state is reflected in an apparatus configuration diagram simulating an external appearance of the multifunction peripheral 10, and displaying the machine image on the display 13.

The paper feed tray management program 233 is a program to be read by the controller 11 when generating tray information in which sheet information is associated with a paper feed tray mounted in the multifunction peripheral 10. The controller 11 that has read the paper feed tray management program 233 manages the generated tray information in a paper feed tray management table to be described later. Further, the controller 11 that has read the paper feed tray management program 233 performs determination processing based on a display priority based on an image forming operation to be described later, and changes the display order of tray information on a paper feed tray to be changed as necessary. Note that, processing of changing the display order of tray information is described later.

The paper feed tray management table storage area 234 is a storage area that stores a paper feed tray management table. Herein, a paper feed tray management table is described with reference to FIG. 2A. FIG. 2A is a diagram illustrating a configuration example of a data structure of a paper feed tray management table 2341.

The paper feed tray management table 2341 includes, as management items, a tray ID, a mounting position, a display position, a remaining amount, and sheet information. The tray ID is an identifier for uniquely identifying a paper feed tray. The mounting position is associated with an identifier for identifying a mounting port of a paper feed tray provided in the multifunction peripheral 10, and indicates a mounting position of a paper feed tray with respect to the multifunction peripheral 10. The display position indicates a display position of a paper feed tray on a system information screen. The remaining amount indicates the remaining amount of sheets (remaining number of sheets) stored in a paper feed tray. The remaining amount of sheets may be, for example, a detection result based on an optical or mechanical sheet detection sensor, or an approximate value computed based on an execution history on a job using sheets stored in the paper feed tray. Note that, FIG. 2A is an example in which the remaining amount of sheets is schematically indicated by using an icon, but the method of expressing the remaining amount is not limited thereto, and a ratio of the remaining number of sheets with respect to the total number of sheets storable in a paper feed tray may be expressed by a numerical value (such as an approximate value or an estimated value). The sheet information indicates sheet information on sheets stored in a paper feed tray. The sheet information may be manually input by the user via an unillustrated setting screen in association with a paper feed tray for storing sheets, or may be automatically downloaded from a server device or the like capable of providing sheet information. In the present disclosure, information in which a tray ID, a mounting position, a display position, and a remaining amount are associated with the sheet information is referred to as tray information.

For example, a paper feed tray identified by the tray ID "1" indicates a paper feed tray mounted at the mounting position "#1" of the multifunction peripheral 10. The controller 11 displays tray information on the paper feed tray related to the tray ID "1" at the display position "D1" on a system information screen together with the remaining amount and the sheet information illustrated in FIG. 2A.

The controller 11 that has read the paper feed tray management program 233 can display, on a system information screen, a list of tray information, based on the mounting order (mounting positions #1 to #8) of paper feed trays to be managed by the paper feed tray management table 2341. The display order of tray information at this occasion may be a descending order or an ascending order. Further, the controller 11 that has read the paper feed tray management program 233 can change the display order of list display from the display order based on a mounting order according to a display priority based on an image forming operation.

The job management table storage area 235 is a storage area that stores a job management table to be managed by the controller 11 that has read the job control program 231. The job management table is generated according to a user/mode (operation mode of a job). Herein, the job management table is described with reference to FIG. 2B. FIG. 2B is a diagram illustrating a configuration example of a data structure of a job management table 2351. Note that, the job management table 2351 related to a copy job is described with reference to FIG. 2B.

The job management table 2351 illustrated in FIG. 2B includes, as management items, a job ID, a set time, a user/mode, the set number of copies, a status, image data, and a tray ID. The job ID is an identifier for uniquely identifying a job registered as a job queue. The set time indicates a time at which a job is set. In this case, the set time may be set as an input time of an instruction to execute a copy job, or may be a time when a document to be copied is set in the image inputter 21 (for example, a scanner device or the like). The user/mode indicates an execution user name of the job, an operation mode name related to execution of the job, or the like. Note that, in a case where the execution user of a job is unknown (for example, in a case where the execution user executes a job or the like without logging in to the multifunction peripheral 10), the item may be blank. The set number of copies indicates the scheduled number of copies. The status indicates an execution status of a job, for example, waiting, copying, or the like. The image data indicate a storage destination (folder/file path) of image data serving as an original image for copying. The tray ID indicates a tray ID of a paper feed tray that stores sheets to be fed to the image former 19 in the copy job.

For example, a job identified by the job ID "0101" indicates a job related to the operation mode "copy" set at the set time "2020/04/01 15:30". The copy job is an example of a copy job in which the image data "MFP/ADF/001234571.pdf" are set as an original image for copying, and the set number "0050" of copies is set. Further, the status of the copy job is "waiting". The tray ID to be managed by the job management table 2351, and the tray ID to be managed by the paper feed tray management table 2341 have the same value. In other words, the controller 11 can recognize a paper feed tray to be operated in execution of the job by referring to the job management table 2351.

The machine image storage area 236 is a storage area that stores a machine image file to be displayed on a system information screen, as a machine image by the controller 11 that has read the machine image display control program 2322.

1.2 Flow of Processing

Figure 3:
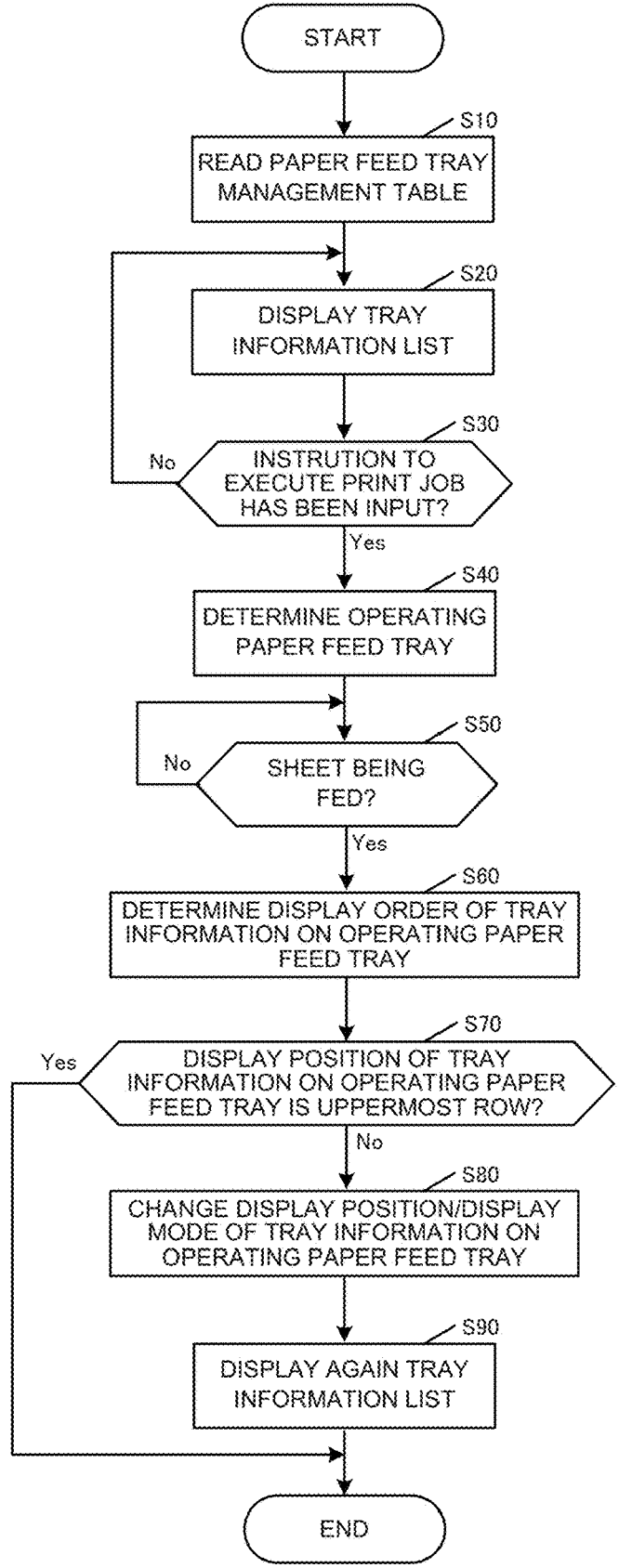
FIG. 3 is a flowchart illustrating a flow of processing according to the first embodiment.

Next, a flow of processing according to the first embodiment is described. The first embodiment is an embodiment in which the display order of list of tray information is changed from a display order based on a mounting order according to a display priority based on an image forming operation. FIG. 3 is a flowchart illustrating processing of changing tray information on a paper feed tray in operation in a print job to the display position of the uppermost row in list display, as a display priority, and displaying the tray information. The processing illustrated in FIG. 3 is processing to be performed by the controller 11 by reading the job control program 231, the display control program 232, the paper feed tray management program 233, and the like.

Prior to list display processing of tray information, the controller 11 reads the paper feed tray management table 2341 (step S10). Subsequently, the controller 11 generates screen information for displaying a list of tray information, based on a management item to be managed by the paper feed tray management table 2341. Then, the controller 11 displays a list of the tray information on the display 13 (system information screen) (step S20). Note that, in step S20, the display order of tray information to be displayed by the controller 11 becomes a display order in which the mounting order of a paper feed tray with respect to the multifunction peripheral 10 is reflected.

Subsequently, the controller 11 determines whether an instruction to execute a print job such as copying or printing has been input by the user (step S30). In a case where it is determined that an instruction to execute a print job has been input, the controller 11 determines the paper feed tray to be operated by execution of the print job, as an operating paper feed tray (step S30; Yes→step S40). In this case, the controller 11 can determine the operating paper feed tray related to an execution job by referring to a management item (tray ID) in the job management table 2351 illustrated in FIG. 2B. Note that, in a case where it is determined that an instruction to execute a print job has not been input, the controller 11 continues to display the list of tray information (step S30; No→step S20).

Subsequently, the controller 11 determines whether a sheet for printing is being fed from the determined operating paper feed tray to the image former 19 (step S50). In a case where it is determined that a sheet is not being fed, the controller 11 waits until the sheet is being fed (step S50; No).

On the other hand, in a case where it is determined that a sheet is being fed from the operating paper feed tray, the controller 11 determines the display order of tray information on the operating paper feed tray (step S50; Yes→step S60). In this case, the controller 11 can determine the display order of tray information by referring to the paper feed tray management table 2341 illustrated in FIG. 2A regarding the tray information related to the operating paper feed tray determined in step S40.

Subsequently, the controller 11 determines, based on the determination result in step S60, whether the display order of tray information on the operating paper feed tray is the first place, in other words, whether the display position of tray information on the operating paper feed tray is the display position of the uppermost row in list display including tray information on other paper feed trays (step S70).

In a case where it is determined that the display position of tray information on the operating paper feed tray is not the display position of the uppermost row, the controller 11 changes the display position of tray information on the operating paper feed tray to the uppermost row. Then, the controller 11 changes the display mode of tray information related to the operating paper feed tray to a display mode different from that of tray information on other paper feed trays, for example, by displaying the tray information in a different display color (step S70; No→step S80). Then, the controller 11 displays again the list of tray information, based on the display position and the display mode changed in step S80, and finishes the processing (step S90).

On the other hand, in a case where it is determined that the display position of tray information on the operating paper feed tray is the uppermost row in list display, the controller 11 finishes the processing (step S70; Yes→"end").

Figure 4:
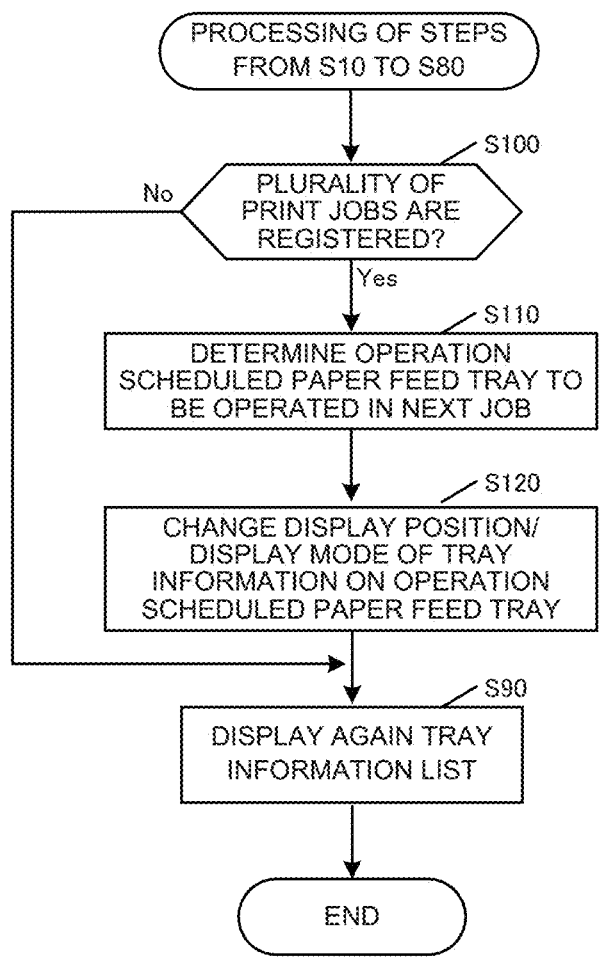
FIG. 4 is a flowchart illustrating a flow of processing according to the first embodiment.

FIG. 4 is a flowchart illustrating processing of changing the display position of tray information on a paper feed tray scheduled to be operated in a next print job following a print job in execution, as a display priority.

Note that, in the processing described with reference to FIG. 4, since the pieces of processing from step S10 to step S80 in FIG. 3 can be made common, description thereof is omitted herein. Note that, a portion that can be made the same processing as the processing described in FIG. 3 is indicated by the same step number, and description thereof may be omitted.

After the pieces of processing from steps S10 to S80, the controller 11 determines whether a plurality of print jobs are registered (step S100).

In a case where it is determined that a plurality of print jobs are registered, the controller 11 determines a paper feed tray (operation scheduled paper feed tray) scheduled to be operated in a next job (step S100; Yes→step S110). Subsequently, the controller 11 changes the display position of tray information on the operation scheduled paper feed tray to a position below (directly below) the uppermost row. In addition, the controller 11 changes the display mode of tray information related to the operation scheduled paper feed tray to a display mode different from that of tray information on the operating paper feed tray and other paper feed trays, for example, by displaying the tray information in a different display color (step S120).

Then, the controller 11 displays again the list of tray information, based on the display position and the display mode changed in step S120, and finishes the processing (step S90). Note that, in a case where it is determined that a plurality of print jobs are not registered, the controller 11 displays again the list of tray information, based on the display position and the changed display mode of tray information related to the operating paper feed tray, and finishes the processing (step S100; No→step S90).

Figure 5:
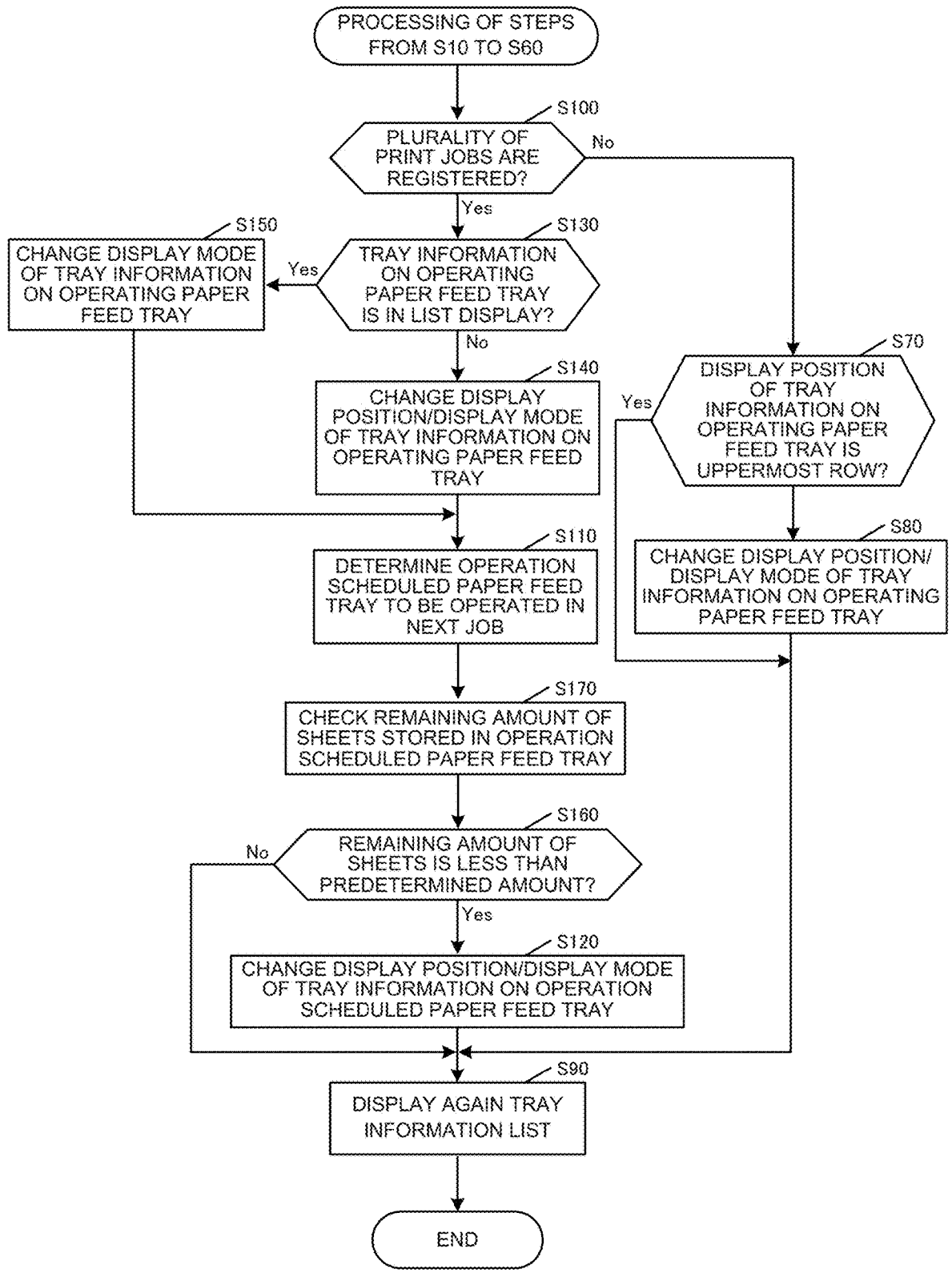
FIG. 5 is a flowchart illustrating a flow of processing according to the first embodiment.

FIG. 5 is a flowchart illustrating processing of changing the display position of the tray information, in a case where the remaining amount of sheets (remaining number of sheets) stored in the operation scheduled paper feed tray scheduled to be operated in a next print job following a print job in execution, as a display priority, is less than a predetermined remaining amount.

Note that, also regarding the processing described with reference to FIG. 5, since the pieces of processing from step S10 to step S60 in FIG. 3 can be made common, description thereof is omitted herein. Note that, a portion that can be made the same processing as the processing described in FIG. 3 or FIG. 4 is indicated by the same step number, and described.

After the pieces of processing from step S10 to step S60, the controller 11 determines whether a plurality of print jobs are registered (step S100).

In a case where it is determined that a plurality of print jobs are registered, the controller 11 determines whether tray information on the operating paper feed tray is being displayed as list display (step S100; Yes→step S130). In a case where it is determined that tray information on the operating paper feed tray is being displayed as list display, the controller 11 changes the display mode of tray information on the operating paper feed tray (step S130; Yes→step S150). On the other hand, in a case where it is determined that tray information on the operating paper feed tray is not being displayed as list display, the controller 11 changes the display position of tray information on the operating paper feed tray to, for example, the uppermost row in list display. Then, the controller 11 changes the display mode of tray information related to the operating paper feed tray to a display mode different from that of tray information on other paper feed trays, for example, by displaying the tray information in a different display color (step S140).

Subsequently, the controller 11 determines the operation scheduled paper feed tray scheduled to be operated in a next job (step S110). Then, the controller 11 checks the remaining amount of sheets (remaining number of sheets) stored in the operation scheduled paper feed tray (step S170).

In a case where it is determined that the remaining amount of sheets stored in the operation scheduled paper feed tray is less than a predetermined amount, the controller 11 changes the display position of tray information on the operation scheduled paper feed tray. Then, the controller 11 changes the display mode of tray information related to the operation scheduled paper feed tray to a display mode different from that of tray information on the operating paper feed tray and other paper feed trays, for example, by displaying the tray information in a different display color (step S160; Yes→step S120). Note that, in step S140, in a case where the display mode is a mode in which the display position of tray information on the operating paper feed tray is changed to the uppermost row in list display, the display position of tray information on the operating paper feed tray may be set to a position below (directly below) the tray information on the operating paper feed tray. On the other hand, in the same step, in a case where the display position of tray information on the operating paper feed tray is not changed to the uppermost row in list display, or in a case where tray information on the operating paper feed tray is displayed as list display, but the display position thereof is not the uppermost row in list display (step S130; Yes), it is preferable to change the display position of tray information on the operation scheduled paper feed tray to the uppermost row position in list display.

Note that, regarding that the remaining amount of sheets is "less than a predetermined amount", for example, a case where the remaining amount of sheets (remaining number of sheets) falls below a value specifically provided as a threshold value, such as being less than $1/3$ or less than $1/5$ of the total number of sheets storable in the paper feed tray may be defined as "less than a predetermined amount", or a case where the scheduled number of sheets for use related to a print job to be executed exceeds the remaining amount of sheets may be defined as "less than a predetermined amount".

Then, the controller 11 displays again the list of tray information, based on the display position and the display mode changed in step S120, and finishes the processing (step S90).

In a case where it is determined that a plurality of print jobs are not registered, the controller 11 determines whether the display position of tray information on the operating paper feed tray is the display position of the uppermost row in list display including tray information on other paper feed trays (step S70).

In a case where it is determined that the display position of tray information on the operating paper feed tray is not the display position of the uppermost row, the controller 11 changes the display position of tray information on the operating paper feed tray to the uppermost row. Then, the controller 11 changes the display mode of tray information related to the operating paper feed tray to a display mode different from that of tray information on other paper feed trays, for example, by displaying the tray information in a different display color (step S70; No→step S80). Then, the controller 11 displays again the list of tray information, based on the display position and the display mode changed in step S80, and finishes the processing (step S90).

On the other hand, in a case where it is determined that the display position of tray information on the operating paper feed tray is the uppermost row, the controller 11 finishes the processing (step S70; Yes→"end").

1.3 Operation Example

Figure 6:
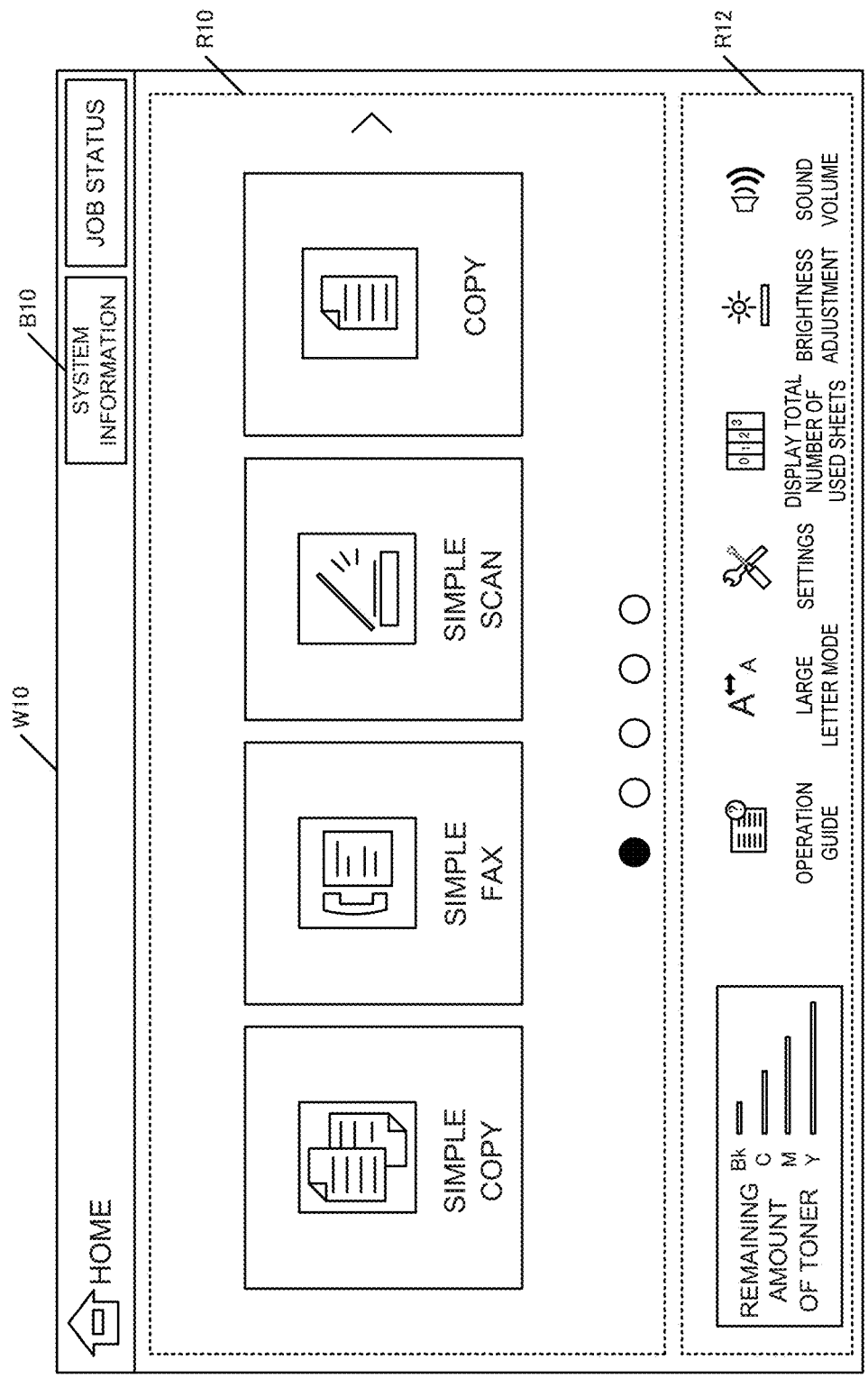
FIG. 6 is a diagram illustrating an operation example according to the first embodiment.

Next, an operation example according to the first embodiment is described. FIG. 6 is a diagram illustrating a display configuration example of a home screen W10 that receives an instruction to display a system information screen. The home screen W10 illustrated in FIG. 6 can be configured as a basic screen that is displayed on a display, for example, at a power-on time, at a standby time, at a time of recovery from a sleep state, or the like, and receives an operation input by the user. The home screen W10 as described above includes a mode selection button display area R10, a fixed display area R12, and a system information button B10.

The mode selection button display area R10 is a display area that displays a mode selection button that receives an instruction to select an operation mode related to execution of a job; a function selection button that receives an instruction to display, for example, an address book for managing destination information and the like related to an image transmission job, setting history information in which a history on an execution job and a setting value of the execution job are associated with each other; and the like; and the like. The home screen W10 illustrated in FIG. 6 is an example in which a mode selection button related to an operation mode of "simple copy", "simple fax", "simple scan", and "copy" is displayed. The user can execute a job in an operation mode associated with a mode selection button by selecting any mode selection button displayed in the mode selection button display area R10. Note that, the configuration example of the mode selection button and the like illustrated in FIG. 6 is merely an example, and the settings can be changed via an unillustrated setting screen.

The fixed display area R12 is an area that displays apparatus setting items related to language settings, an operation guide, maintenance, and the like, and is a display area whose display position is fixed. FIG. 6 is an example in which apparatus setting items related to "remaining amount of toner", "operation guide", "large letter mode", "settings", "total number of used sheets", "brightness adjustment", and "sound volume" are displayed, as apparatus setting items. Note that, the display position of the fixed display area R12 is not fixed to the position (position below the mode selection button display area R10) illustrated in FIG. 6, and may be set, for example, above the mode selection button display area R10, or may be set to any position on left and right ends of the home screen W10.

The system information button B10 is a button that receives an instruction to display a system information screen to be described with reference to the next drawing. The system information screen is a display screen that provides a display area capable of displaying a list of tray information on a paper feed tray. Upon receiving an instruction to select the system information button B10, the controller 11 displays a system information screen on the display 13.

Next, a system information screen to be displayed by the controller 11 in response to user's selection of the system information button B10 on the home screen W10 is described with reference to FIG. 7. A system information screen W20 illustrated in FIG. 7 is a display screen that collectively displays information related to a notice to the user, machine information on the multifunction peripheral 10, an execution status of a job, tray information on a paper feed tray, apparatus setting items, and the like.

Figure 7:
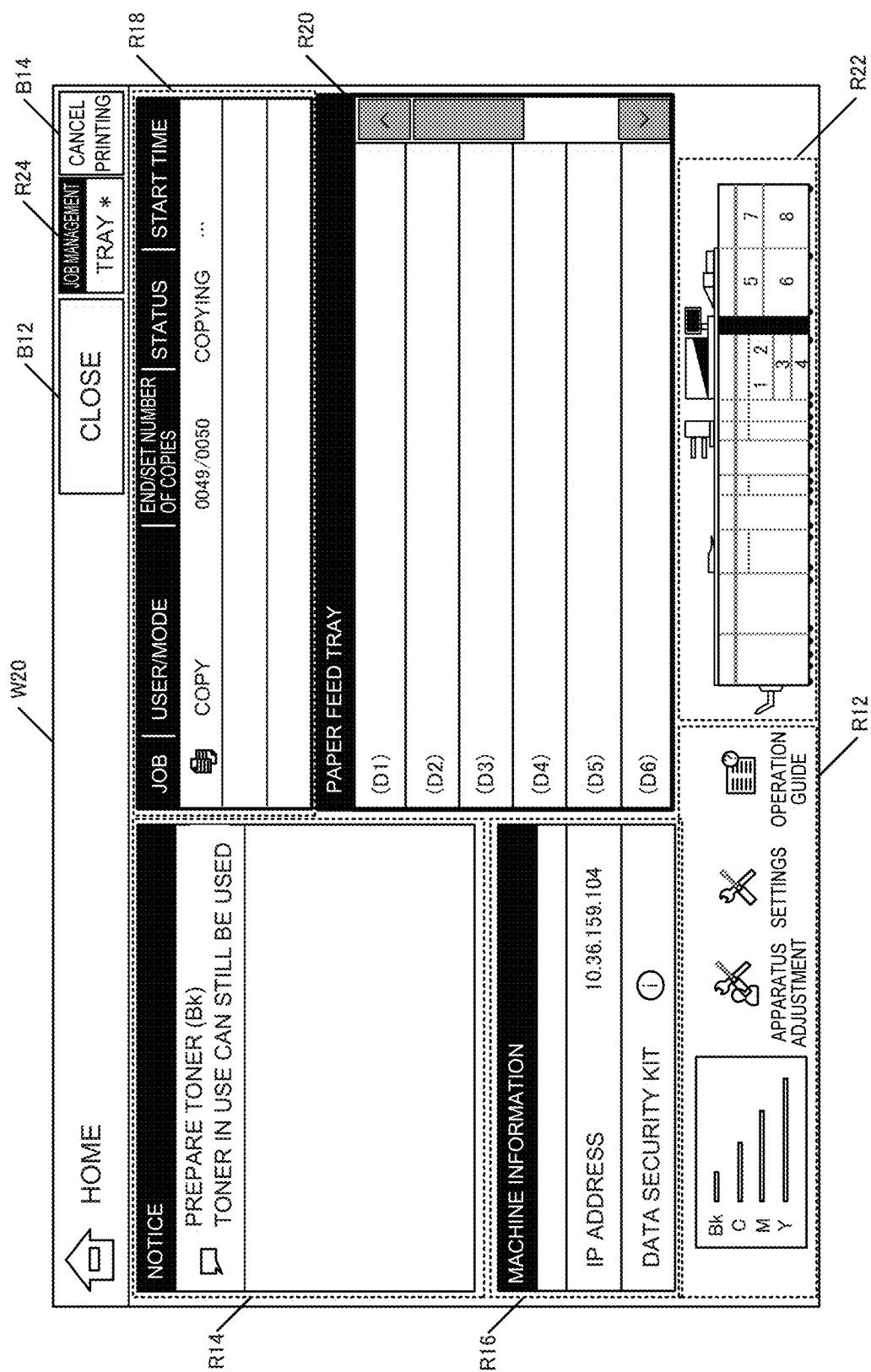
FIG. 7 is a diagram illustrating an operation example according to the first embodiment.

The system information screen W20 illustrated in FIG. 7 includes a notice area R14, a machine information area R16, a job queue area R18, a tray information area R20, a fixed display area R12, a machine image area R22, a close button B12, a job management information area R24, and a print cancel button B14. Note that, since the fixed display area R12 may have the same configuration as the fixed display area R12 included in the home screen W10 in FIG. 6, description thereof is omitted herein.

The notice area R14 is a display area that displays a notification content to the user, as a notice. The machine information area R16 is a display area that displays, as machine information, information unique to the multifunction peripheral 10 such as network setting information such as an IP address, and option information applied to the multifunction peripheral 10.

The job queue area R18 is a display area that displays information related to an execution status of a job, and a reserved job (job queue). Note that, the controller 11 displays, on the job queue area R18, screen information reflecting a content of a management item (see FIG. 2B) read from the job management table 2351.

The tray information area R20 is a display area in which a list of tray information can be displayed by displaying tray information on a paper feed tray to be managed by the paper feed tray management table 2341 at each of display positions D1 to D6. Note that, a display mode of tray information in the tray information area R20 is described later.

The machine image area R22 is a display area that displays a machine image simulating an external appearance of the multifunction peripheral 10. In a machine image to be displayed in the machine image area R22, a mounting position (in the drawing, any position of #1 to #8) of a paper feed tray associated with a paper feed tray specified in the tray information area R20 can be displayed in a highlighted manner. Similarly to the display mode of a paper feed tray in the tray information area R20, as far as a target paper feed tray can be identified in the entire configuration of the apparatus, there is no restriction to the display mode such as a display color and a filling pattern. In this way, the user can easily recognize a target paper feed tray by displaying a mounting position of a paper feed tray specified in the tray information area R20 within a machine image in a highlighted manner.

The close button B12 is a button that receives an instruction to finish display of the system information screen W20. When the close button B12 is selected by the user, the controller 11 finishes display of the system information screen W20.

The job management information area R24 is a display area that displays an optional management item selected from the job management table 2351 in relation to execution of a job. FIG. 7 is an example in which tray information on a paper feed tray in operation in a print job in execution is set to be displayed as a management item to be displayed in the job management information area R24. For example, in a case where a paper feed tray that stores sheets to be used in a copy job is the paper feed tray*, "tray*" is displayed as the paper feed tray in operation in the job management information area R24. By checking the paper feed tray to be displayed in the job management information area R24, the user can recognize the paper feed tray in operation in a print job such as a copy job or a print job.

The print cancel button B14 is a button that receives an instruction to cancel a print job in execution. Note that, display of the print cancel button B14 may be switched to, for example, a fax cancel button, an image transmission cancel button, or the like according to an operation mode of a job in execution.

Figure 8:
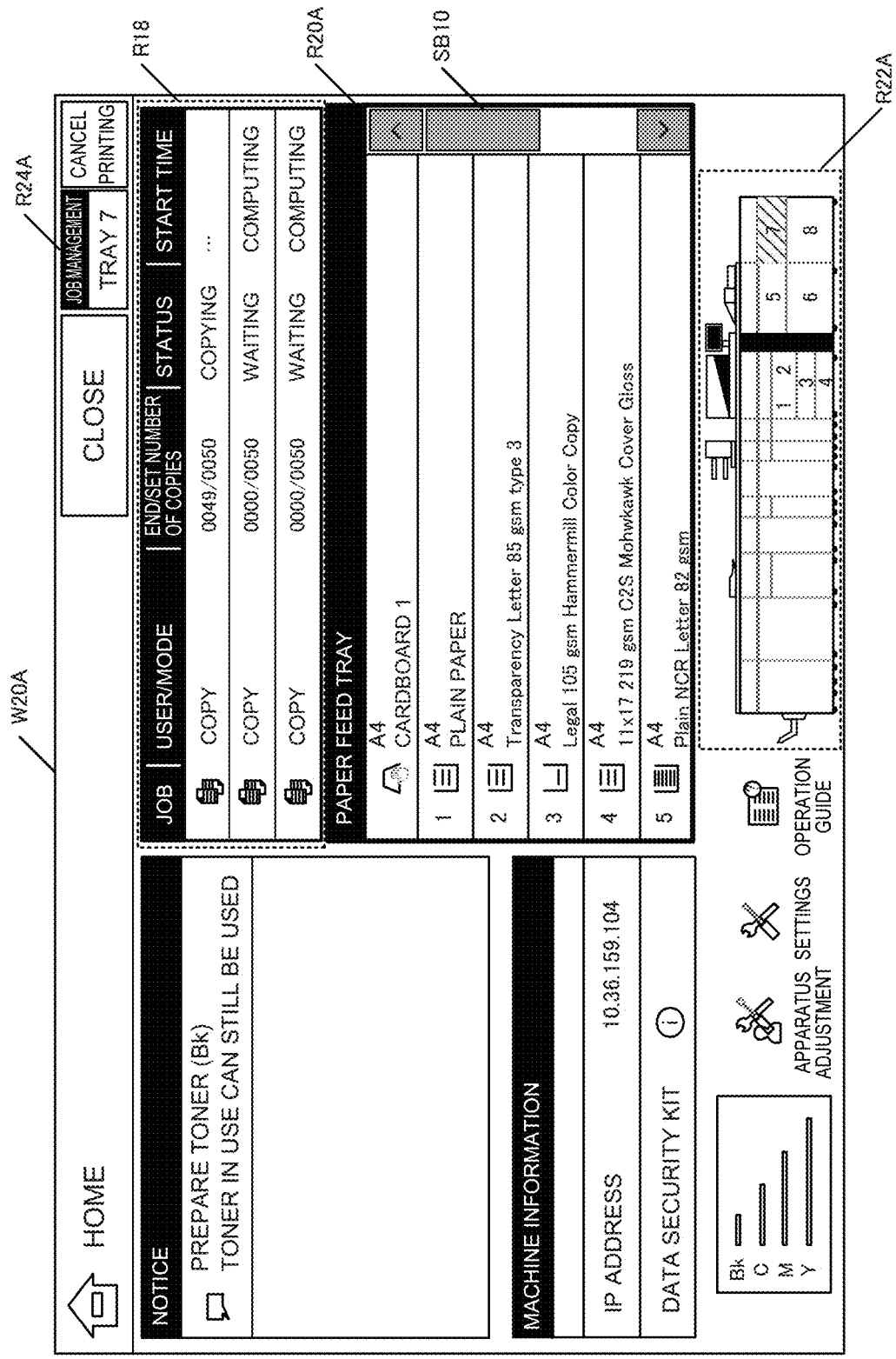
FIG. 8 is a diagram illustrating an operation example according to the first embodiment.

FIG. 8 is a diagram illustrating a display example of a system information screen W20A in a case where tray information on a paper feed tray desired to be displayed is not included in list display. Note that, a content of a management item read from the job management table 2351 in FIG. 2B is reflected in the job queue area R18 on the system information screen W20A. Further, a tray information area R20A indicates a manner in which a list of tray information to be managed in the paper feed tray management table 2341 in FIG. 2A is displayed based on the mounting order with respect to the multifunction peripheral 10.

Herein, it is assumed that the paper feed tray in operation in a copy job in execution has the tray ID "7". Therefore, in a machine image area R22A, the mounting position of the paper feed tray associated with the tray ID "7" in operation is emphasized by an oblique line pattern. Further, in a job management information area R24A, the tray ID "7" is displayed as the paper feed tray in operation.

However, in the tray information area R20A, only a total of six pieces of tray information (a manual feed tray, and trays from the tray ID "1" to the tray ID "5") including tray information related to the manual feed tray can be displayed as a list at one time due to restriction of a displayable area. In a mode in which tray information on a paper feed tray is displayed in a descending order, based on the mounting order, tray information related to the tray ID "7" in operation is not included in list display. Therefore, it is necessary for the user to move the display area by operating a scroll bar SB10, for example, in order to check a content of tray information related to the paper feed tray in operation, which takes time and effort.

Figure 9:
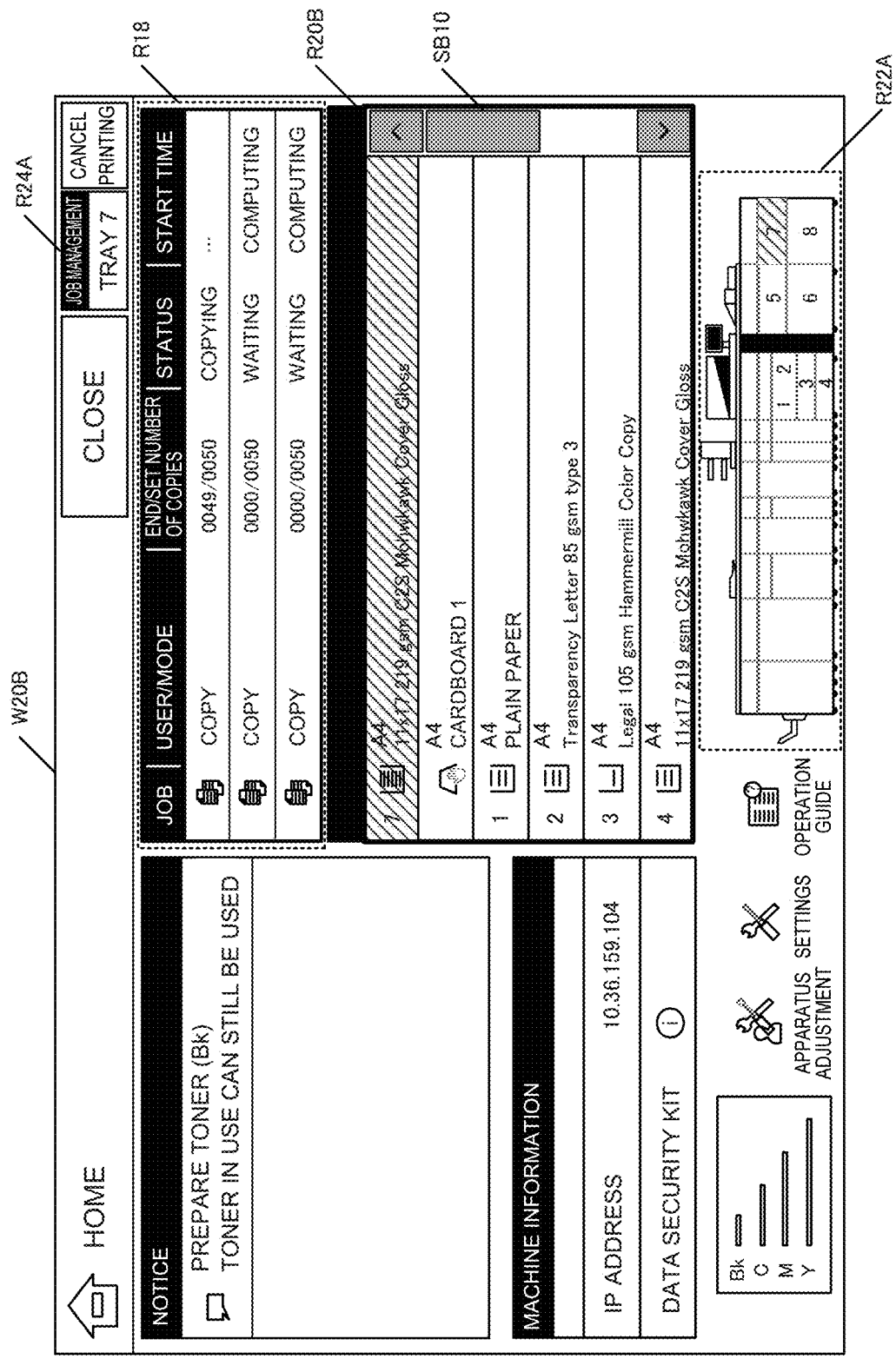
FIG. 9 is a diagram illustrating an operation example according to the first embodiment.

FIG. 9 is a diagram illustrating a display example of a system information screen W20B after processing of changing the display position of tray information on a paper feed tray in operation in a print job to the display position of the uppermost row in list display, as a display priority, and displaying the tray information. Note that, the present operation example is an operation example associated with the processing described with reference to the flowchart in FIG. 3.

The tray information area R20B illustrated in FIG. 9 is an example in which the display position of tray information related to the tray ID "7" determined as the operating paper feed tray is changed from the original display position (D7; see FIG. 2A) to the uppermost row (D1) in list display, and the tray information is displayed in a display mode (oblique line pattern display in the example in FIG. 9) different from that of the other tray information. In this way, since tray information on the paper feed tray determined as the operating paper feed tray is displayed at the uppermost row position in list display, the user can check a content of tray information related to the paper feed tray in operation without performing a special operation such as an operation for the scroll bar SB10.

Figure 10:
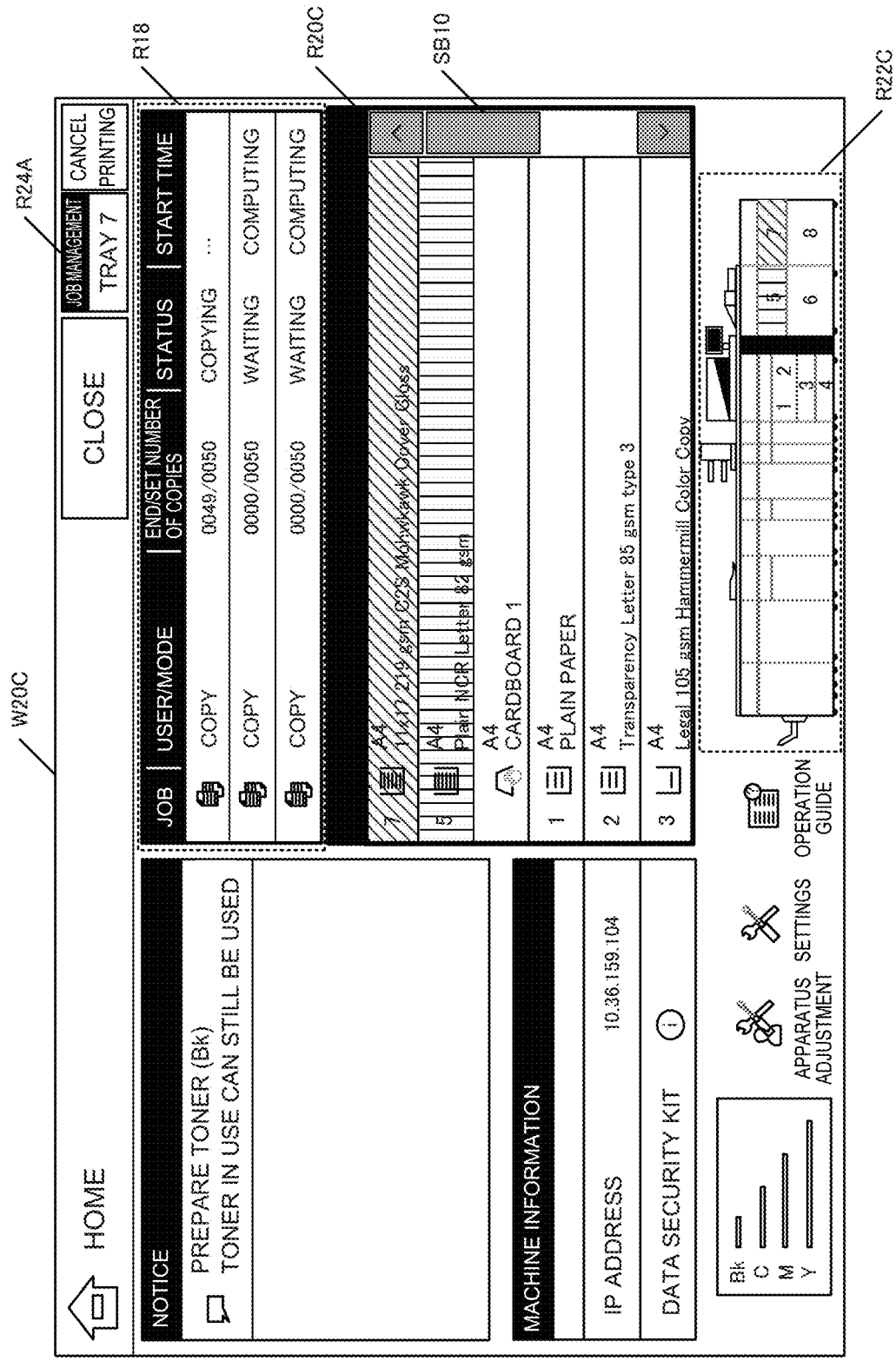
FIG. 10 is a diagram illustrating an operation example according to the first embodiment.

FIG. 10 is a diagram illustrating a display example of a system information screen W20C after processing of changing the display position of tray information on an operation scheduled paper feed tray scheduled to be operated in a next print job following a print job in execution is performed as a display priority. Note that, the present operation example is an operation example associated with the processing described with reference to the flowchart in FIG. 4.

In the tray information area R20C illustrated in FIG. 10, the display position of tray information on the tray ID "5" determined as the operation scheduled paper feed tray is changed to a position below (directly below) tray information related to the tray ID "7" determined as the operating paper feed tray, and the tray information is displayed in a display mode (vertical line pattern display in the example illustrated in FIG. 10) different from the display mode of tray information on the operating paper feed tray and other paper feed trays. Note that, the example in FIG. 10 indicates a machine image (machine image area R22C) in which the mounting position of a paper feed tray associated with the determined operation scheduled paper feed tray is displayed in a highlighted manner by vertical line pattern display. In this way, tray information on the paper feed tray determined as the operating paper feed tray is displayed at the uppermost row position in list display, and tray information on the paper feed tray determined as the operation scheduled paper feed tray is displayed at a position below (directly below) the uppermost row position in list display. Therefore, the user can check a content of tray information related to the operating paper feed tray and the operation scheduled paper feed tray without performing a special operation such as an operation for the scroll bar SB10.

Figure 11:
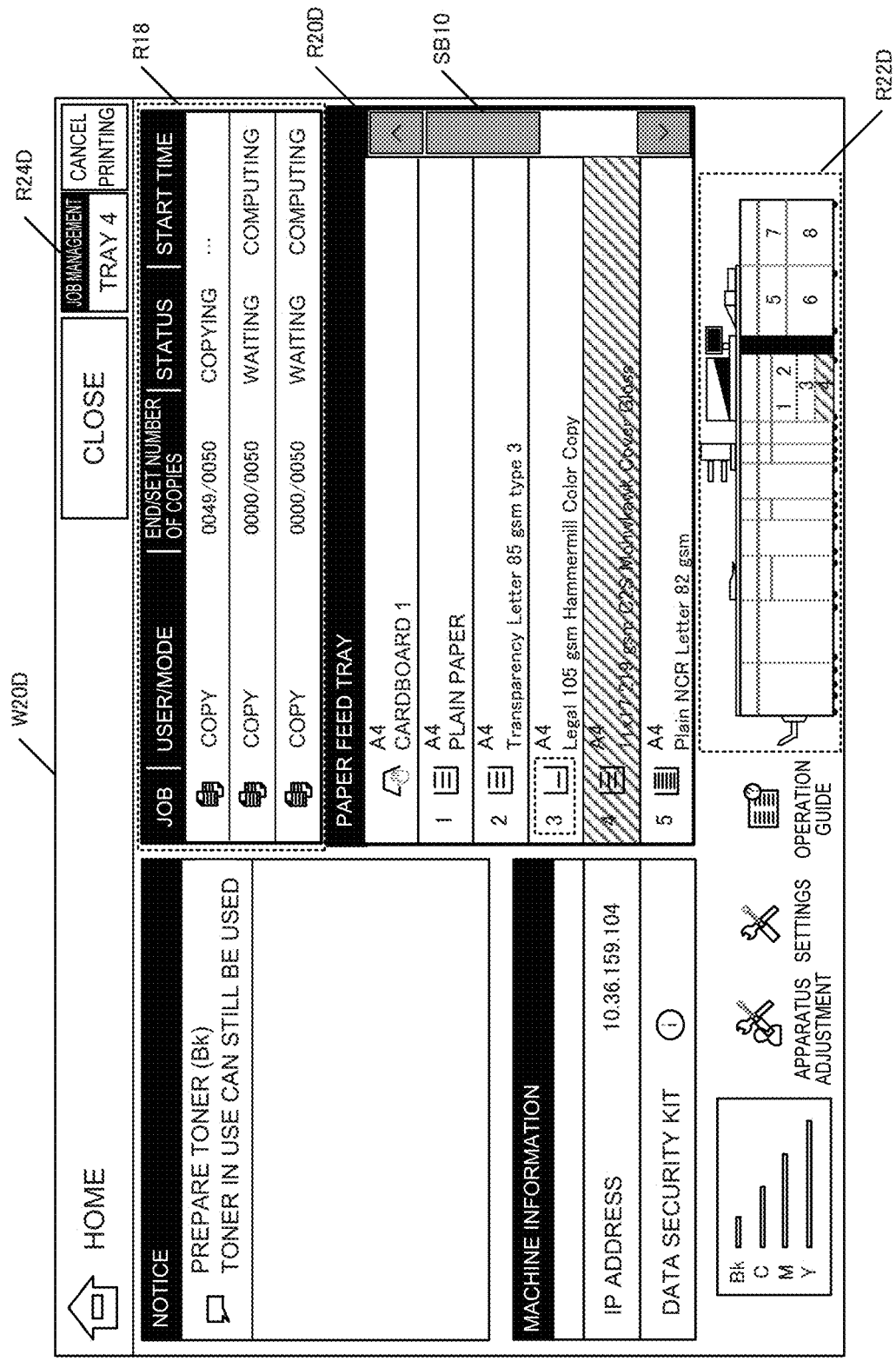
FIG. 11 is a diagram illustrating an operation example according to the first embodiment.

FIG. 11 is a diagram illustrating a display example of a system information screen W20D related to processing of changing the display position of tray information, as a display priority, in a case where the remaining amount of sheets (remaining number of sheets) stored in the operation scheduled paper feed tray scheduled to be operated in a next print job following a print job in execution is less than a predetermined remaining amount. Note that, the operation example in FIG. 11 is an operation example associated with processing related to step S100 (; Yes)→step S130 (; Yes) →step S150 in FIG. 5, and is an operation example in a case where only the display mode is changed without changing the display position of the operating paper feed tray, since tray information on the paper feed tray determined as the operating paper feed tray is included in list display during display.

In FIG. 11, description is made based on a premise that the operating paper feed tray in operation in a copy job in execution is the tray ID "4". Therefore, in a machine image area R22D, the mounting position of the paper feed tray associated with the tray ID "4" in operation is displayed in a highlighted manner by an oblique line pattern. Further, in the job management information area R24D, the tray ID "4" is displayed as a paper feed tray in operation.

Then, in the tray information area R20D, tray information on the tray "4" determined as the operating paper feed tray is displayed in a display mode different from that of other tray information by an oblique line pattern. Herein, in a case where the operation scheduled paper feed tray scheduled to be operated in a next print job is a paper feed tray of the tray ID "3", and the remaining amount of sheets stored in the paper feed tray related to the tray ID "3" is less than a predetermined amount (dotted line frame in the drawing), the controller 11 changes the display position and the display mode of tray information on the tray ID "3".

Figure 12:
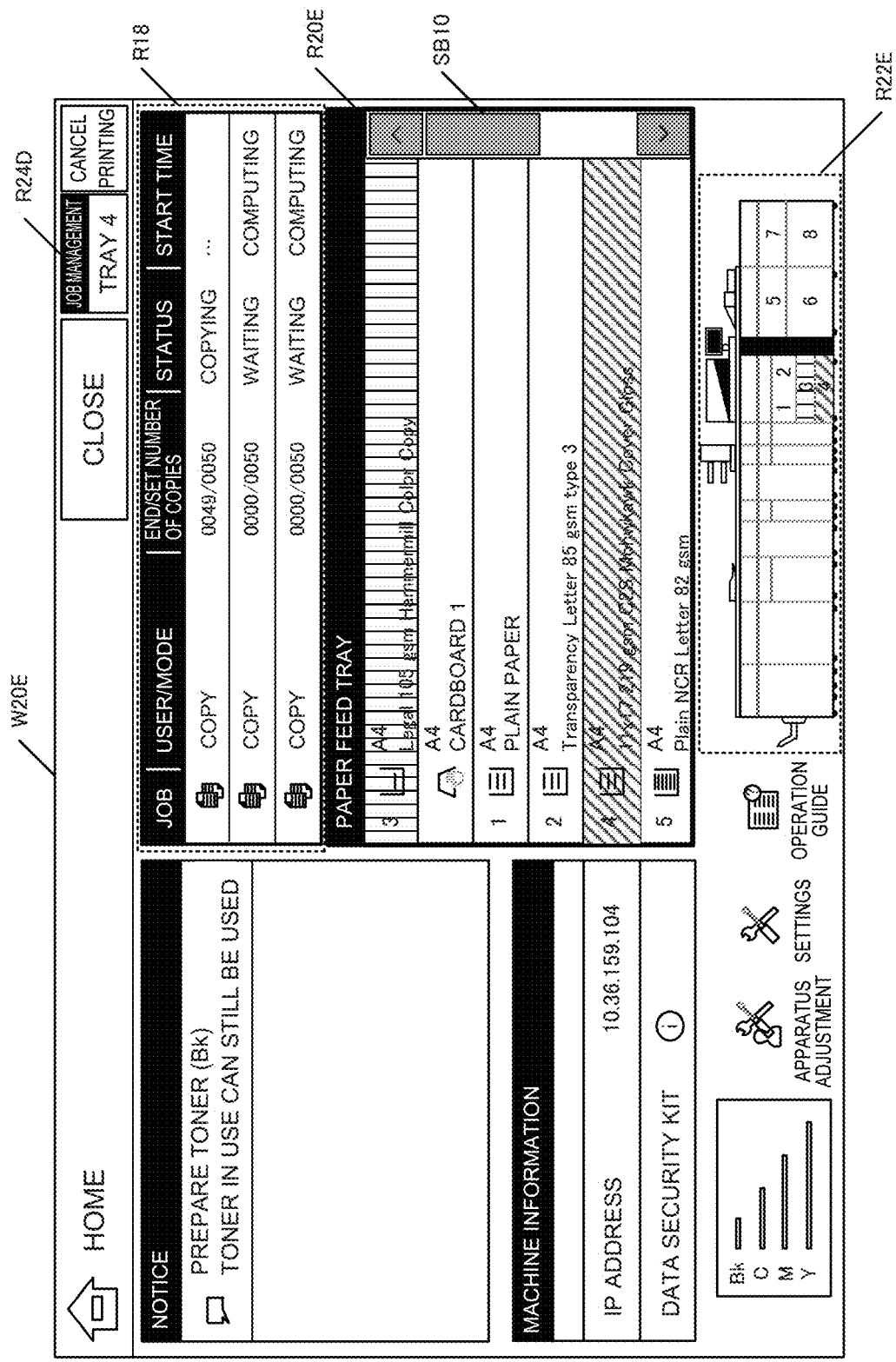
FIG. 12 is a diagram illustrating an operation example according to the first embodiment.

FIG. 12 is a diagram illustrating a display example of a system information screen W20E after the display position and the display mode of tray information on the tray ID "3" are changed. In a case of the example in FIG. 12, the display position of tray information on the tray ID "3" is changed to the uppermost row in list display, and the tray information is displayed in a display mode (vertical line pattern display in the example in FIG. 12) different from that of tray information on the operating paper feed tray and other paper feed trays. Note that, the example in FIG. 12 indicates a machine image (machine image area R22E) in which the mounting position of a paper feed tray associated with the operation scheduled paper feed tray (paper feed tray in which the remaining amount of stored sheets is less than a predetermined amount) is displayed in a highlighted manner by vertical line pattern display. In this way, in a case where the remaining amount of sheets stored in the paper feed tray determined as the operation scheduled paper feed tray is less than a predetermined amount, the operation scheduled paper feed tray can be displayed at the uppermost row in list display. Therefore, the user can check the necessity of sheet replenishment to the operation scheduled paper feed tray without performing a special operation such as an operation for the scroll bar SB10.

As described above, according to the first embodiment, the display order of tray information on a paper feed tray can be changed from the display order of list display based on a mounting order according to a display priority based on an image forming operation in a case where the remaining amount of sheets stored in a paper feed tray in operation, in a paper feed tray scheduled to be operated in a job following a job in execution, and in a paper feed tray scheduled to be operated in a next job is less than a predetermined amount. Therefore, the user can check desired tray information without performing a special operation.

2. Second Embodiment

A second embodiment is an embodiment related to an image forming apparatus including an image former, a paper feed tray that feeds a sheet as a recording medium to the image former, a display that displays a list of tray information on the paper feed tray, based on a mounting order with respect to an apparatus, and a controller that controls display of the display. The controller determines tray information to be displayed, and displays the tray information, in a case where tray information determined to be displayed is not included in list display during display.

2.1 Functional Configuration

Since a functional configuration of a multifunction peripheral according to the second embodiment can be made the same as the functional configuration of the multifunction peripheral 10 according to the first embodiment, the functional configuration is indicated by the same reference sign, and description thereof is omitted.

2.2 Flow of Processing

Figure 13:
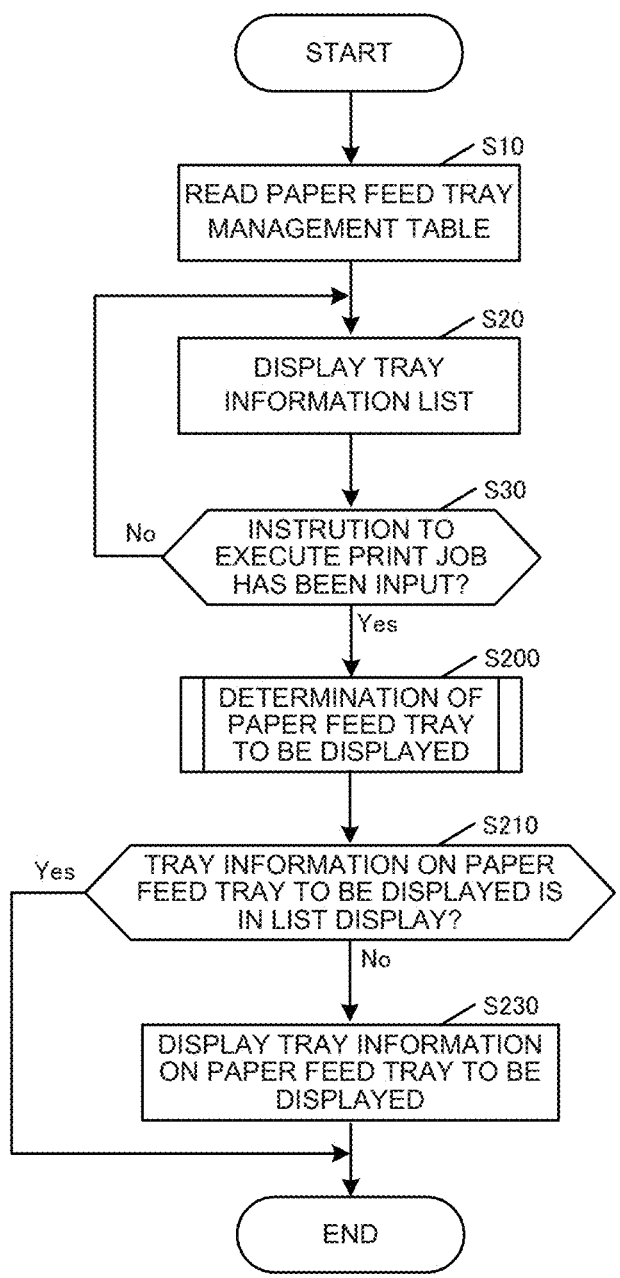
FIG. 13 is a flowchart illustrating a flow of processing according to a second embodiment.

FIG. 13 is a flowchart illustrating processing of displaying tray information, in a case where tray information on a paper feed tray to be displayed is not included in list display during display. The processing illustrated in FIG. 13 is processing to be performed by reading a job control program 231, a display control program 232, a paper feed tray management program 233, and the like by a controller 11. Note that, the same processing as the processing described in FIG. 3 is indicated by the same step number, and description thereof is omitted.

In step S30, in a case where the controller 11 determines that an instruction to execute a print job such as copying or printing has been input, the controller 11 determines a paper feed tray (display target paper feed tray) to be displayed (step S30; Yes→step S200). Note that, in a case where it is determined that an instruction to execute a print job has not been input, the controller 11 continues to display the list of tray information (step S30; No→step S20).

When the display target paper feed tray is determined, the controller 11 determines whether tray information on the display target paper feed tray is included in list display (step S210). In a case where it is determined that tray information on the display target paper feed tray is not included in list display, the controller 11 displays tray information on the display target paper feed tray, and finishes the processing (step S210; No→step S230). On the other hand, in a case where it is determined that tray information on the display target paper feed tray is included in list display, the controller 11 finishes the processing (step S210; Yes→"end").

Figure 14:
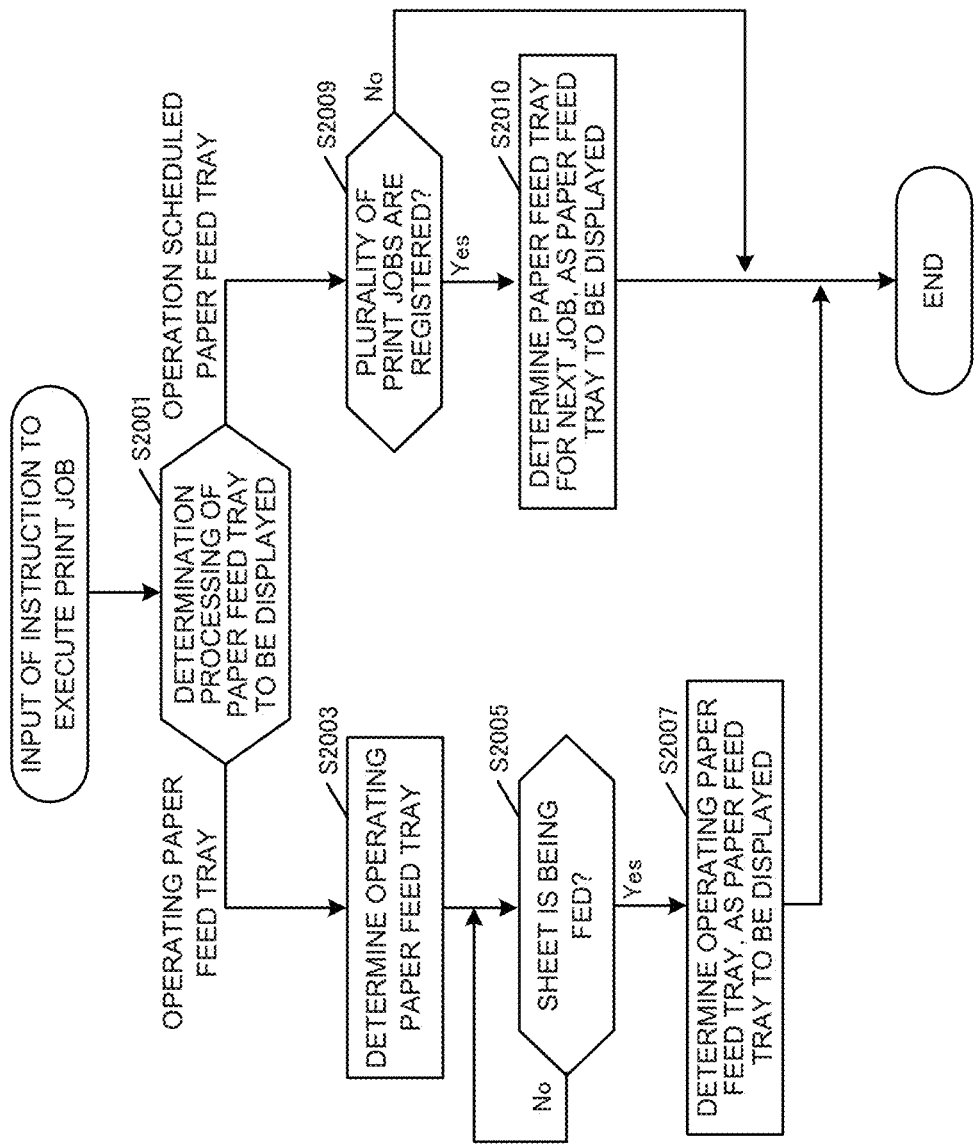
FIG. 14 is a flowchart illustrating a flow of processing according to the second embodiment.

FIG. 14 is a flowchart illustrating determination processing of a display target paper feed tray in step S200 in FIG. 13. Note that, in the second embodiment, a paper feed tray in operation (operating paper feed tray) or a paper feed tray (operation scheduled paper feed tray) scheduled to be operated in a job following a job in execution are described as an example of a paper feed tray to be displayed. Note that, determination as to which one of the operating paper feed tray or the operation scheduled paper feed tray is determined as a display target paper feed tray may be set in advance via an unillustrated setting screen, or a paper feed tray related to both of the operating paper feed tray and the operation scheduled paper feed tray may be determined as a display target paper feed tray.

In FIG. 14, in a case where an operating paper feed tray is set as a display target paper feed tray, when the controller 11 starts processing, the controller 11 determines the operating paper feed tray related to an execution job (step S2001→step S2003). In this case, the controller 11 can determine the operating paper feed tray related to the execution job by referring to a management item of the tray ID in the job management table 2351 illustrated in FIG. 2B.

Then, the controller 11 determines whether a sheet for printing is being fed from the determined operating paper feed tray to an image former 19 (step S2005). In a case where it is determined that a sheet is not being fed from the operating paper feed tray, the controller 11 waits until the sheet is being fed (step S2005; No).

In a case where it is determined that a sheet is being fed from the operating paper feed tray, the controller 11 determines the operating paper feed tray, as a display target paper feed tray, and finishes the processing (Yes in step S2005→step S2007).

On the other hand, in a case where an operation scheduled paper feed tray is set as a display target paper feed tray, when the controller 11 starts processing, the controller 11 determines whether a plurality of print jobs are registered (step S2001→step S2009).

In a case where it is determined that a plurality of print jobs are registered, the controller 11 determines an operation scheduled paper feed tray scheduled to be operated in a next job, and determines the operation scheduled paper feed tray, as a display target paper feed tray (step S2009; Yes→step S2010). Note that, in a case where it is determined that a plurality of print jobs are not registered, the controller 11 finishes the processing (step S2009; No→"end").

2.3 Operation Example

Next, an operation example according to the second embodiment is described with reference to FIGS. 15 to 17. In the second embodiment, as display modes of tray information on a display target paper feed tray, (1) superimposed display of tray information on a display target paper feed tray, (2) automatic scroll to a display position of tray information on a display target paper feed tray, and (3) expanded display (two column display) of a tray information area are described. Note that, in the operation examples described with reference to FIGS. 15 to 17, an operation example in a case where a display target paper feed tray is an operating paper feed tray is described, and the operating paper feed tray is a paper feed tray of the tray ID "7".

Figure 15:
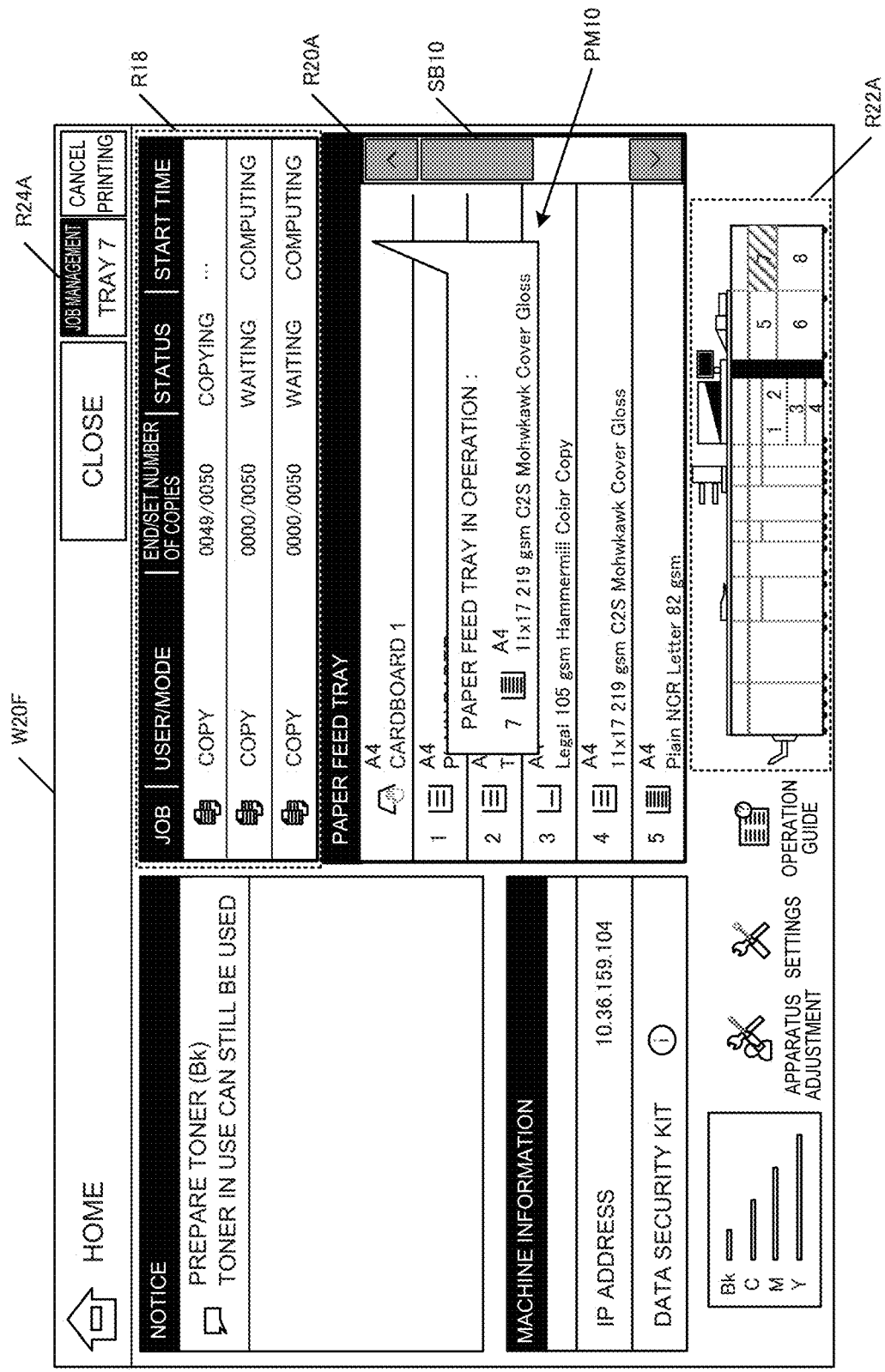
FIG. 15 is a diagram illustrating an operation example according to the second embodiment.

FIG. 15 is a diagram illustrating a configuration in which tray information on a display target paper feed tray is displayed by (1) superimposed display. Note that, a portion that can be made the same configuration as the configuration described in the first embodiment is indicated by the same reference sign, and description thereof is omitted.

A system information screen W20F illustrated in FIG. 15 displays, as a pop-up message PM10, tray information on a display target paper feed tray in a superimposed manner on the other tray information displayed in the tray information area R20A. The pop-up message PM10 can indicate information of the same content as the (other) tray information to be displayed in the tray information area R20A. The display position of the pop-up message PM10 may be displayed at a position where display information partially or completely overlaps other tray information, or does not overlap at all. Further, it is possible to make a background color, a display font, a size, and the like of a display area related to the pop-up message PM10 different from a background color, a display font, a size, and the like related to display of other tray information. Further, it is possible to delete, from a display screen, a display area related to the pop-up message PM10 after a predetermined time elapses from display.

Figure 16:
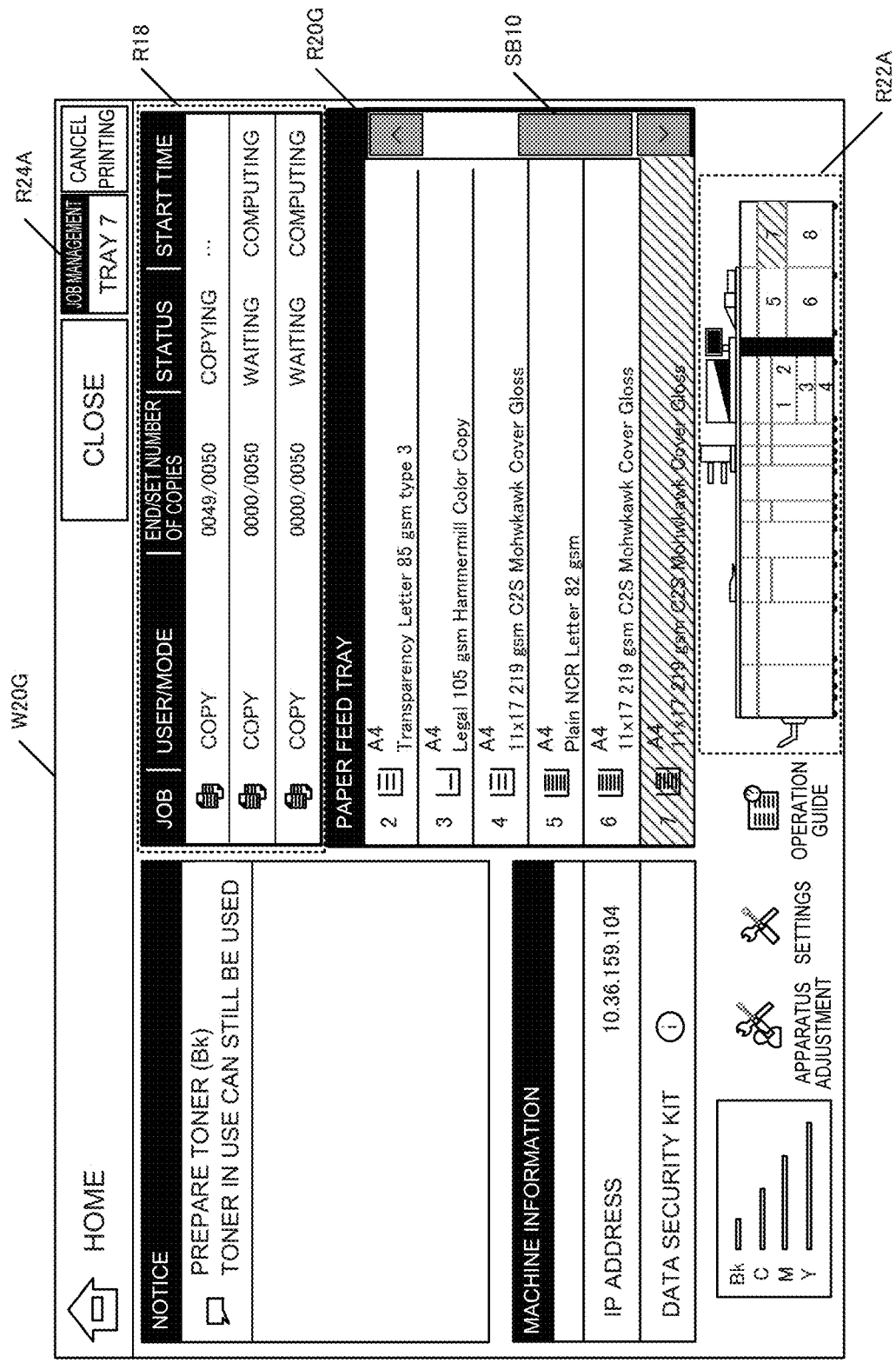
FIG. 16 is a diagram illustrating an operation example according to the second embodiment.

FIG. 16 is a diagram illustrating a configuration in which tray information on a display target paper feed tray is displayed by (2) automatically scrolling to a display position of the tray information. In a tray information area R20G om a system information screen W20G illustrated in FIG. 16, by automatically scrolling to the display position of tray information on the tray ID "7" determined as a display target paper feed tray, the tray information on the tray ID "7" is displayed. In this case, as illustrated in FIG. 16, it is preferable to display the tray ID "7" in a different display mode (in the drawing, oblique line pattern display) in such a way that it is easy to be distinguished from other tray information.

Figure 17:
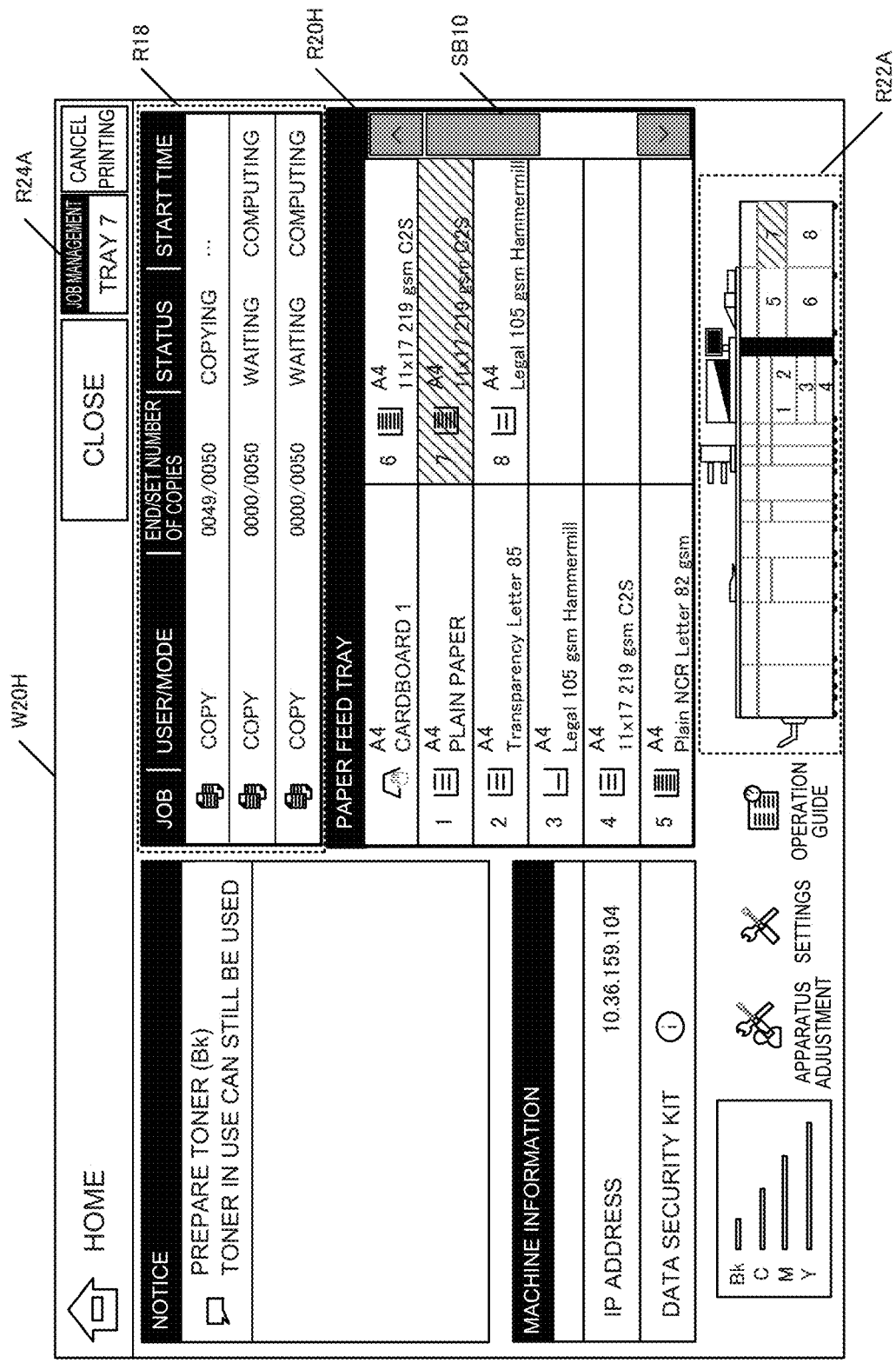
FIG. 17 is a diagram illustrating an operation example according to the second embodiment.

FIG. 17 is a diagram illustrating a configuration in which tray information on a display target paper feed tray is displayed by (3) expanding and displaying (two column display) a tray information area. The number of display rows (display area) is expanded to two columns in such a way that tray information on the tray ID "7" determined as a display target paper feed tray can be displayed in a tray information area R20H on a system information screen W20H illustrated in FIG. 17. In this case, as illustrated in FIG. 17, it is preferable that the tray ID "7" is displayed in a different display mode (in the drawing, oblique line pattern display) in such a way that it is easy to be distinguished from other tray information.

As described above, according to the second embodiment, even in a case where tray information related to a paper feed tray to be displayed is not included in a list of tray information during display, it is possible to display tray information related to the paper feed tray to be displayed without performing a special operation such as an operation for a scroll bar. At this occasion, since it is not necessary to change the display position of tray information to be displayed from the display order based on a mounting order with respect to the multifunction peripheral, it is possible to omit processing associated with change in the display position during list display. Consequently, tray information on a paper feed tray to be displayed can be displayed at a high speed and with a low load.

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

In addition, the above-described embodiments have parts that are described separately for convenience of description. However, it is needless to say that the embodiments may be combined and implemented within the technically possible range.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

In addition, each functional block, or various features of a device used in the above-described embodiments may be implemented or performed by electrical circuitry, e.g., an integrated circuit or a plurality of integrated circuits. The electrical circuitry designed to implement the functions described in the present specification may include a general purpose processor, a digital signal processor (DSP), an application-specific integrated circuit (ASIC), a field programmable gate array (FPGA), or other programmable logic device, a discrete gate, or a transistor logic, a discrete hardware component, or any combination thereof. The general purpose processor may be a microprocessor, a conventional processor, a controller, a microcontroller, or a state machine. The above-described electrical circuitry may be configured of a digital circuit, or may be configured of an analog circuit. In addition, in a case where an integrated circuit technology that replaces a current integrated circuit appears due to progress of a semiconductor technology, one or more aspects of the present disclosure can use a new integrated circuit according to the technology.

What is claimed is:

1. An image forming apparatus comprising:
an image former;
at least one paper feed tray that feeds a sheet to the image former;
a display that displays a list of tray information on the at least one paper feed tray based on a mounting order with respect to an apparatus; and
a controller that controls display of the display, wherein
the controller changes a display order of the list of the tray information according to a display priority based on an image forming operation, and
the controller causes the display to display the tray information of any one of paper feed trays at an uppermost position in the list in a case that a remaining amount of recording media, stored in a paper feed tray that is in operation, in a paper feed tray that is scheduled to be operated in a job following another job in execution, or in a paper feed tray that is scheduled to be operated in a next image forming operation, is less than a predetermined remaining amount.

2. The image forming apparatus according to claim 1, wherein the controller further causes the display to display the tray information on a paper feed tray a display order of which is to be changed in a display mode different from display of the tray information on another paper feed tray.

3. An image forming apparatus comprising:
an image former;
at least one paper feed tray that feeds a sheet to the image former;
a display that displays a list of tray information on the at least one paper feed tray based on a mounting order with respect to an apparatus; and
a controller that controls display of the display, wherein
the controller determines the tray information to be displayed, and when the tray information determined to be displayed is not included in the tray information displayed in the list based on the mounting order, the controller causes the display to display the determined tray information so as to be superimposed on the tray information displayed in the list.

4. The image forming apparatus according to claim 3, wherein the controller determines, as a display target, a paper feed tray to be operated in association with an image forming operation, or a paper feed tray that is scheduled to be operated in a next image forming operation.

5. The image forming apparatus according to claim 3, wherein the controller scrolls a screen displaying the list to a display position of the tray information on a paper feed tray that is in operation.

6. The image forming apparatus according to claim 3, wherein the controller further causes the display to display the tray information on a paper feed tray that is in operation by increasing a number of display rows in the list.

7. A display control method of controlling display of tray information on at least one paper feed tray that feeds a sheet to an image former, the display control method comprising:

displaying a list of the tray information based on a mounting order with respect to an apparatus;

changing a display order of the list of the tray information according to a display priority based on an image forming operation; and displaying the tray information of any one of paper feed trays at an uppermost position in the list in a case that a remaining amount of recording media, stored in a paper feed tray that is in operation, in a paper feed tray that is scheduled to be operated in a job following another job in execution, or in a paper feed tray that is scheduled to be operated in a next image forming operation, is less than a predetermined remaining amount.

* * * * *